United States Patent
Kim

[11] Patent Number: 5,442,346
[45] Date of Patent: Aug. 15, 1995

[54] REMOTE CONTROL TRANSMITTING DEVICE OF ROBOT

[75] Inventor: Ji-Hyun Kim, Seoul, Rep. of Korea

[73] Assignee: Samsung Electronics Co., Ltd., Kyungki, Rep. of Korea

[21] Appl. No.: 36,858

[22] Filed: Mar. 25, 1993

[30] Foreign Application Priority Data

Mar. 25, 1992 [KR] Rep. of Korea ............... 92-4719

[51] Int. Cl.$^6$ ............................................. H04Q 1/00
[52] U.S. Cl. ........................ 340/825.57; 340/825.69; 340/825.22
[58] Field of Search ............ 340/825.57, 825.22, 340/825.24, 825.52, 825.69, 825.72; 359/144

[56] References Cited

U.S. PATENT DOCUMENTS

| | | | |
|---|---|---|---|
| 3,774,217 | 11/1973 | Bonner | 340/825.69 |
| 4,549,179 | 10/1985 | Stendardo | 340/825.69 |
| 4,626,848 | 12/1986 | Ehlers | 340/825.72 |
| 4,772,799 | 9/1988 | Inui | 359/144 |
| 4,814,742 | 3/1989 | Morita | 359/144 |
| 4,935,736 | 6/1990 | Meierdierck | 340/825.69 |

FOREIGN PATENT DOCUMENTS 2125647  3/1984  United Kingdom ............... 359/144

*Primary Examiner*—Donald J. Yusko
*Assistant Examiner*—Brian Zimmerman
*Attorney, Agent, or Firm*—Sughrue, Mion, Zinn, Macpeak & Seas

[57] ABSTRACT

A remote control transmitting device for a robot includes a secret number switching unit for inputting user's secret numbers; a function selecting switch for allowing the user to select a robotic function; a high level & open signal transmitting circuit for outputting voltage signals representing various robotic functions, respectively; an operation command switching unit for receiving operation commands from the user such as release, warning sound, scouting, left, forward and right; a low and enable signal transmitting circuit for outputting a low signal and an enable signal after receipt of the user's operation command signal outputted from the operation command switching unit; and an encoder for outputting encoded signals in accordance with the low & enable signal transmitting circuit, the secret number switching unit and the high level & open signal transmitting circuit.

12 Claims, 5 Drawing Sheets

FIG.3B secret number waveform(A)

FIG.3C secret number waveform(A)

FIG.3D secret number waveform(A)

FIG.3E secret number waveform(A)

FIG.3F secret number waveform(A)

FIG.3G secret number waveform(A)

FIG. 4A open :

| SWITCH<br>FUNCTION | | SW1 | SW2 | SW3 | SW4 |
|---|---|---|---|---|---|
| alarm | release | OFF | ON | OFF | OFF |
| | alarm sound | OFF | OFF | ON | OFF |
| | scouting | OFF | OFF | OFF | ON |
| moving | left | ON | ON | OFF | OFF |
| | forward | ON | OFF | ON | OFF |
| | right | ON | OFF | OFF | ON |

REMOTE CONTROL TRANSMITTING DEVICE OF ROBOT

FIELD OF THE INVENTION

The present invention relates to a remote control transmitting device used for remotely controlling a mobile monitoring or cleaning robot. The present disclosure is based on the disclosure of Korean Patent Application No. 92-4719 filed Mar. 25, 1992, which disclosure is incorporated herein by reference.

BACKGROUND OF THE INVENTION

As an example of a conventional remote control transmitting device of a robot, U.S. Pat. No. 4,549,179 discloses a remotely-controlled device, as illustrated in FIG. 6, having an integrated circuit-equipped encoder 70. In order to operate the robot, a user presses one of the predetermined buttons mounted on a remote control transmitting device.

In FIG. 6, a reference numeral B61 is a battery, R61–R66 are resistors, Q61 and Q62 are transistors, C61 and C62 are capacitors and D61–D63 are infrared light emitting diodes.

The predetermined buttons consist of secret-coded buttons and function-coded buttons, and when the user wants to use the remote-control transmitting device equipped with same, he or she first presses his or her own secret-coded buttons and then press the function-coded buttons corresponding to an operation of the robot to thereby operate the robot.

However, because the conventional remote control transmitting device consists of only one switch SW61 as a button which can input the function codes, an inconvenience results when providing separate remote control transmitting devices for each operation when the robot is operated to perform various movements.

Accordingly, the cost for a remote control transmitting device necessary for an operation of the robot has increased and many inconveniences involving the various operations of the robot have followed.

Therefore, the present invention has been provided in consideration of the aforementioned drawbacks, and it is an object of the present invention to provide a remote control transmitting device of a robot by which the robot can be easily operated, a manufacturing cost can be lowered and operational functions of the robot can be diversified.

SUMMARY OF THE INVENTION

In order to accomplish the above-described objects, there is provided a remote control transmitting device of a robot for controlling, by radio, the mobile monitoring robot which can monitor the house or office while moving, comprising:

a battery for outputting a direct voltage;

a secret number switching means for inputting the user's secret numbers;

a function selecting switch for the user to select one function among alert functions and movement functions;

a high level & open signal transmitting circuit wherein, when the function selection switch is rendered conductive, a high level voltage outputted from the battery is received to thereby output a high level voltage indicative of the movement functions, and when the function selection switch is turned off, an open signal is generated indicative of the alert functions;

an operation command switching means into which operation commands from the user such as release, warning sound, scouting, left, forward and right are received;

a low & enable signal transmitting circuit for outputting a low signal and an enable signal after receipt of the user's operation command signal outputted from the operation command switching means;

an encoder wherein, when the operation commands indicative of release, warning sound, scouting, left, and right are received from the user, the secret-coded signal outputted from the secret number switching means and the user's function and operation command signals outputted from the high level & open signal transmitting circuit and the low & enable signal transmitting circuit are received to thereby output, in pulses, the secret-coded signals and function & operation command signals; and an output transmitting circuit wherein, after receipt of pulses outputted from a pulse width control circuit and the encoder which controls pulse widths outputted from the encoder, the pulses are modulated to a very high frequency to thereafter be outputted as infrared signals toward the robot.

BRIEF DESCRIPTION OF THE DRAWINGS

For a fuller understanding of the nature and objects of the invention, reference should be made to the following detailed description taken in conjunction with the accompanying drawings in which:

FIG. 3B is a drawing of a signal waveform outputted from an encoder during a release function;

FIG. 3C is a drawing of a signal waveform outputted from the encoder during a warning sound function;

FIG. 3D is a drawing of a signal waveform outputted from the encoder during a scouting function;

FIG. 3E is a drawing of a signal waveform outputted from the encoder when the robot moves to the left;

FIG. 3F is a drawing of a signal waveform outputted from the encoder when the robot moves forwardly;

FIG. 3G is a drawing of a signal waveform outputted from the encoder when the robot moves to the right;

FIG. 4A is a drawing of an output signal of the encoder when an open signal is received into one of the input terminals (A1–A7, DT1, DT2) of the encoder;

DETAILED DESCRIPTION OF THE PREFERRED EMBODIMENT

Hereinafter, a preferred embodiment of the present invention will be described in detail with reference to the accompanying drawings.

Figure 1:
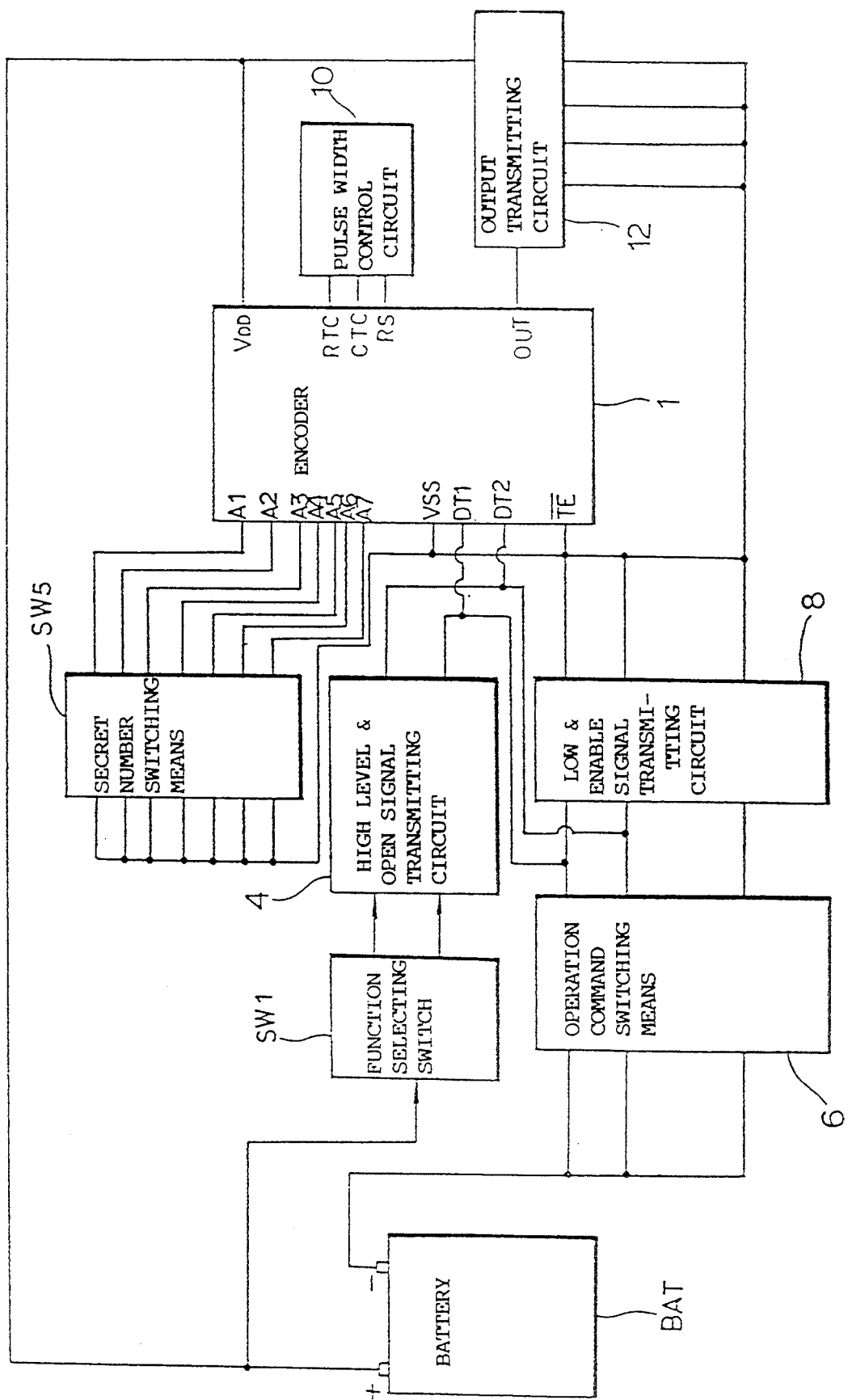
FIG. 1 is a block diagram of an embodiment of a remote control transmitting device of a robot in accordance with the present invention.
Figure 2:
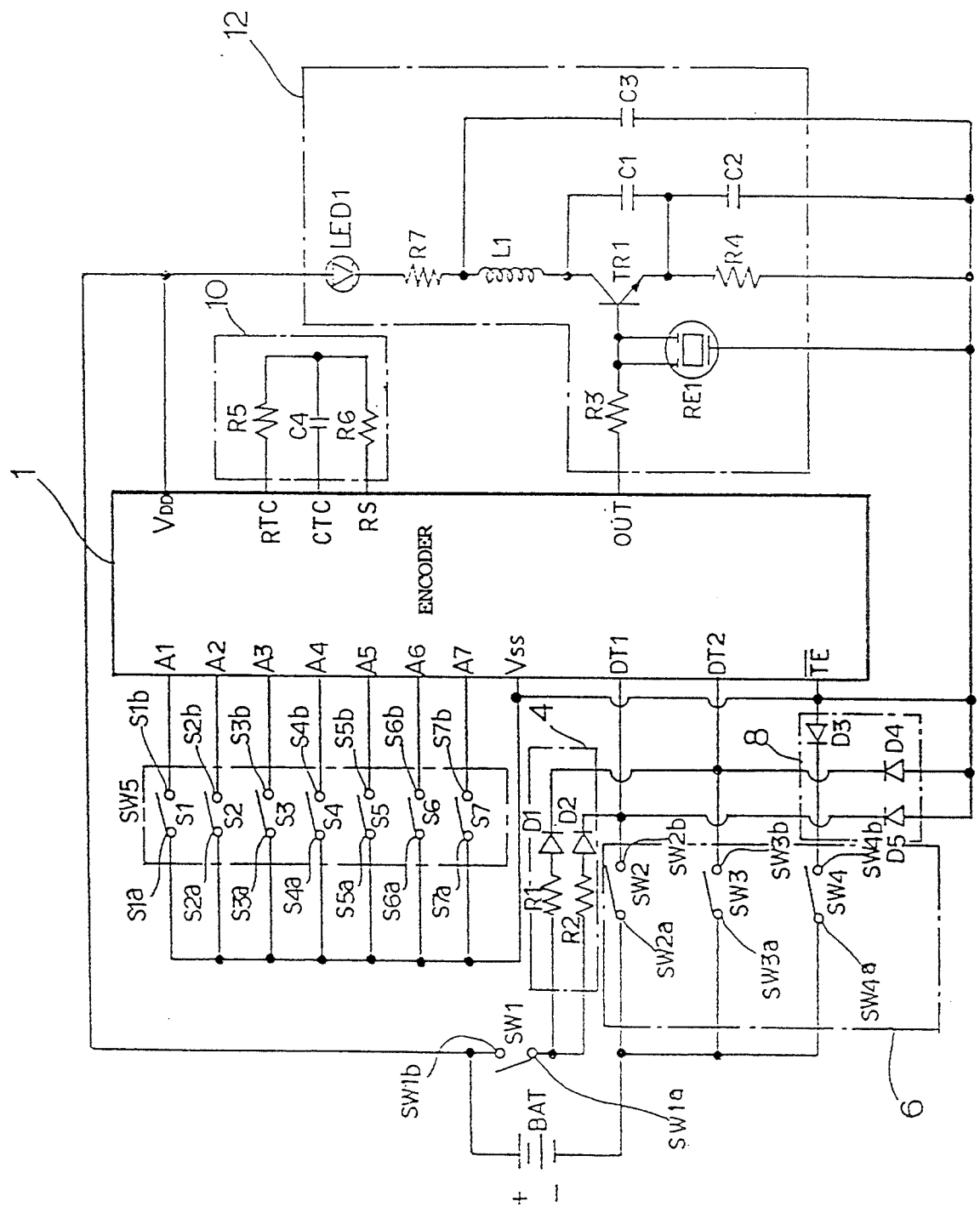
FIG. 2 is a detailed circuit drawing of elements of FIG. 1.

FIG. 1 is a block diagram of an embodiment of a remote control transmitting device of a robot in accordance with an embodiment of the present invention and FIG. 2 is a detailed circuit drawing of FIG. 1, wherein a reference symbol BAT is a battery for outputting a direct current voltage, SW5 is a secret number switching means, and SW1 is a function selecting switch for selecting one function of alert functions and movement functions.

A reference numeral 4 is a high level & open signal transmitting circuit wherein, when the function selecting switch SW1 is rendered conductive, a high level voltage outputted from the battery BAT is received whereby the voltage of high level is recognized as a high level signal by the encoder (to be explained later) to thereby output a voltage indicative of the movement function, and when the function selecting switch SW1 is turned off, signals inputted into input terminals DT1 and DT2 are recognized as open signals by the encoder (to be explained later) to thereby generate a voltage indicative of the alert function.

The reference numeral 6 is an operation command switching means into which operation commands such as release, warning sound, scouting, left, forward and right are inputted from the user, a reference numeral 8 is a low & enable signal transmitting circuit for outputting a low signal and an enable signal after receipt of the user's operation command signal outputted from the operation command switching means 6.

The reference numeral 1 is an encoder wherein, when the operation commands indicative of release, warning sound, scouting, left and right are received from the user, the secret-coded signal outputted from the secret number switching means SW5 and the user's function and operation command signals outputted from the high level & open signal transmitting circuit 4 and the low & enable signal transmitting circuit 8 are received to thereby output pulses representing the secret-coded signal and function & operation command signals. The encoder 1 may be, for example, Motorola's MC145626 integrated circuit.

Furthermore, a reference numeral 10 is a pulse width control circuit for controlling a pulse width outputted from the encoder 1 and reference number 12 is an output transmitting circuit which controls pulse widths outputted from the encoder such that the pulses are modulated to a very high frequency to thereafter be outputted as infrared signals toward the robot.

Referring to FIG. 2, the secret number switching means SW5 is composed of seven switches S1-S7, e.g., movable contacts S1a-S7a which are commonly connected to thereafter be connected to an enable terminal $\overline{TE}$ of the encoder, and stationary contacts S1b-S7b of the seven switches S1-S7 are respectively connected to input terminals A1-A7 of the encoder 1.

The high level & open signal transmitting circuit 4 comprises resistors R1 and R2 and diodes D1 and D2, among which the resistor R1 and diode D1 are connected in series, and the resistor R2 and diode D2 are connected in series.

Those end terminals of resistors R1 and R2 which are not connected to the diodes D1 and D2 are commonly connected to a movable contact SW1a of the function selecting switch SW1.

One end terminal of diode D2 is connected to the input terminal DT1 of the encoder 1 and a stationary contact SW2b of a first switch SW2 of the operation command switching means 6.

The operation command switching means 6 comprises a first switch SW2, second switch SW3 and third switch SW4, and a movable contact SW2a of the first switch SW2, a movable contact SW3a of the second switch SW3 and a movable contact SW4a of the third switch SW4 are commonly connected to a negative (−) terminal of the battery BAT.

A stationary contact SW2b of the first switch SW2 is commonly connected to a cathode of the diode D2 in the high level & open signal transmitting circuit 4 and the input terminal DT1 of the encoder 1.

A stationary contact SW3b of the second switch SW3 is commonly connected to a cathode of the diode D1 in the high level & open signal transmitting circuit 4 and the input terminal DT2 of the encoder 1.

A stationary contact SW4b of the third switch SW4 is connected to a cathode of the diode D3 in the low & enable signal transmitting circuit 8.

The low & enable signal transmitting circuit 8 comprises three diodes, D3, D4 and D5, and anodes of the diodes D3, D4 and D5 are commonly connected to a terminal of ground potential side of the output transmitting circuit 12 and an enable terminal $\overline{TE}$ of the encoder 1.

The cathode of the diode D3 is connected to a stationary contact SW4b of the third switch SW4 in the operation command switching means 6.

A cathode of the diode D4 is connected to the stationary contact SW3b of the second switch SW3 in the operation command switching means 6, and a cathode of the diode D5 is connected to the stationary contact SW2b of the first switch SW2 in the operation command switching means 6.

An earth terminal VSS of the encoder 1 is commonly connected to the enable terminal $\overline{TE}$ of the encoder 1.

The pulse width control circuit 10 comprises a resistor R5, a capacitor C4 and a resistor R6. One end of each of resistor R5, capacitor C4 and resistor R6 is interconnected, and the other end of the resistor R5 is connected to an input terminal RTC of the encoder 1. The other end of the capacitor C4 is connected to an input terminal CTC of the encoder 1 and the other end of the resistor R6 is connected to an input terminal RS of the encoder 1.

Meanwhile, the output transmitting circuit 12 comprises a resonator RE1, infrared light emitting diode LED 1, a pattern antenna L1 printed on a printed circuit board, a transistor TR1, capacitors C1, C2 and C3, and resistors R3, R4 and R5.

One end of the resonator RE1 is connected through the resistor R3 to an output terminal OUT of the encoder 1 and to the base of transistor TR1.

An emitter of the transistor TR1 is commonly connected to the resistor R4 and the capacitor C2, and to a collector of the transistor TR1 through the capacitor C1.

The collector of the transistor TR1 is connected through one end of the capacitor C3 to the pattern antenna L1 and to a balance terminal of the capacitor C3 through the pattern antenna L1, and to a cathode of the light emitting diode LED 1 through a resistor R7.

The operation of the preferred embodiment of the remote control transmitting device of a robot in accordance with the present invention thus constructed will now be described.

First, the user inputs a secret number (for instance 1010111) to the secret number switching means SW5.

At this moment, switches S2 and S4 of the secret number switching means SW5 having, for example, a dip switch shape, are rendered operative and balance switches S1, S3, S5, S6 and S7 in turn are rendered inoperative.

Next, the user determines by which function the robot will be operated.

If the user determines to operate the robot in according to an alert or alarm function, a function selecting switch SW1 having, for example, a slide switch shape, is rendered inoperative.

Next, if the user wants to operate the robot in a scouting function during the alert function, the third switch SW4 of switches SW2, SW3 and SW4 having, for example, a push button switch shape is pressed.

If the third switch SW4 is rendered operative, a current flows through a closed circuit which is formed by a positive (+) terminal of battery BAT→current terminal VDD of the encoder 1→ground terminal of the encoder 1→diode D3→stationary contact SW4b of the third switch SW4→negative (−) terminal of battery, and at the same time, a current flows through a closed circuit which is formed by a positive (+) terminal of battery BAT→anode of light emitting diode LED 1→cathode of light emitting diode LED 1→resistor R7→capacitor C3→diode D3→stationary contact SW4b of the third switch SW4→movable contact SW4a of the third switch SW4→negative (−) terminal of battery BAT.

Accordingly, a power source is supplied to the encoder 1 to thereby render the encoder 1 operative, and an open signal is supplied to an input terminal A1 of the encoder 1 because the switch S1 is rendered inoperative.

A low level signal is supplied to the other input terminal A2 because the switch S2 is rendered conductive.

Subsequently, an open signal is supplied to an input terminal A3, a low level signal is supplied to an input terminal A4, an open signal is supplied to an input terminal A5, an open signal is supplied to an input terminal A6 and an open signal is supplied to an input terminal A7.

Likewise, an open signal is supplied to an input terminal DT1 of the encoder 1 because the switch SW2 is in an open state, and an open signal is supplied to an input terminal DT2 because the switch SW3 is in an open state.

Furthermore, a low level potential is supplied to the enable terminal $\overline{TE}$ of the encoder 1 by interposing the movable contact SW4a, stationary contact SW4b and diode D3 of the third switch SW4 to thereby output from an output terminal OUT of the encoder 1 an item (secret number 1010111) inputted into the input terminals A1–A7 and an item (open, off: scouting command) inputted into the other input terminals DT1 and DT2.

Figure 3A:
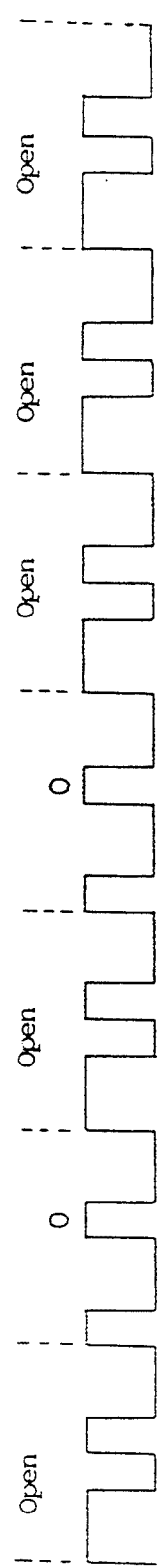
FIG. 3A is a drawing of a signal waveform corresponding to a secret-code number.
Figure 3A:
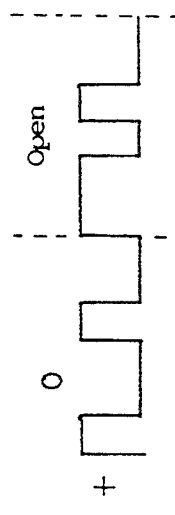
Figure 3A:
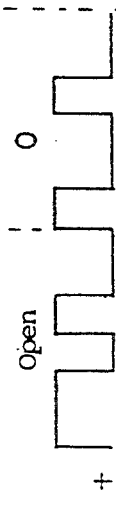
Figure 3A:
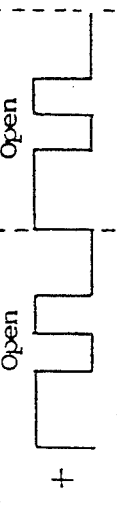
Figure 3A:
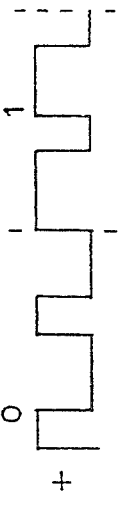
Figure 3A:
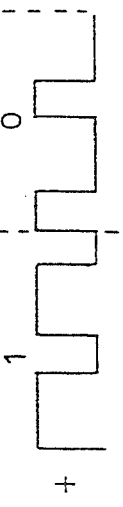
Figure 3A:
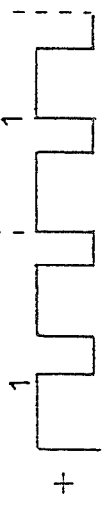
Figure 5:
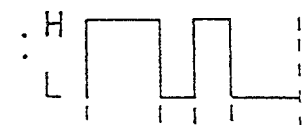
FIG. 5 is a table for showing a correlation between an on-off state of the function selecting switch SW1 illustrated in FIG. 1, three switches SW2, SW3 and SW4 of the operation command switching means, and six kinds of operation commands in accordance with the present invention.
Figure 4B:
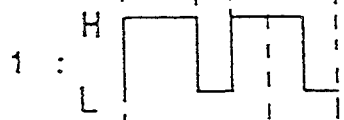
FIG. 4B is a drawing of the output signal of the encoder when a high level signal is received into one of the input terminals (A1–A7, DT1, DT2) of the encoder.
Figure 4C:
FIG. 4C is a drawing of the output signal of the encoder when a low level signal is received into one of input terminals (A1–A7, DT1, DT2) of the encoder.
Figure 6:
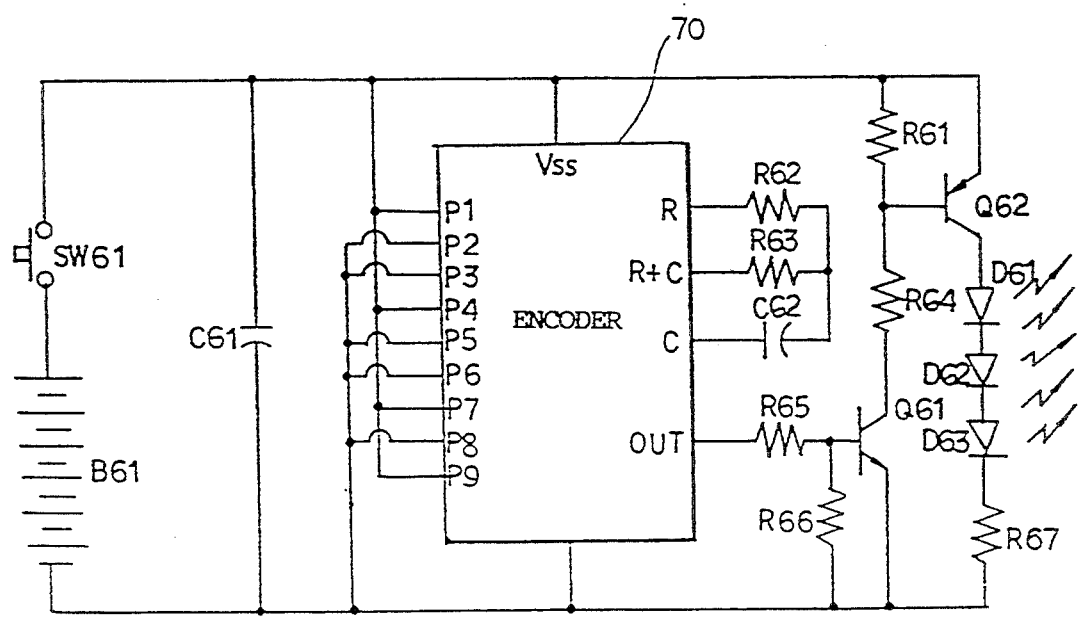
FIG. 6 is a circuit drawing of the remote control transmitting device of a robot in accordance with a conventional technique.

At this moment, output terminal OUT of the encoder 1 sequentially output waveforms as illustrated in FIG. 3A and in the rear portion of FIG. 3D.

Next, when the waveforms are outputted, the resonator RE1 oscillates at approximately 300 MHZ to thereby modulate the waveforms of FIG. 3D to approximately 300 MHZ, and the transistor TR1 amplifies the modulated waveforms whereby an infrared signal is outputted from the light emitting diode LED 1.

Next, an infrared receiving unit of the robot system receives the infrared signal to thereby make the robot perform a scouting function.

When the user wants the robot to generate a warning sound during the scouting function of the robot, the second switch SW3 of the operation command switching means 6 is pressed under a state that the function selecting switch SW1 is rendered inoperative.

When the second switch SW3 is rendered operative, a closed circuit is formed through the diode D4 to thereby supply a low level signal to the enable terminal $\overline{TE}$ and input terminal DT2 of the encoder 1, and the open signal is still supplied to the input terminal DT1, and then a signal is supplied to input terminals A1–A7 of secret numbers in the same manner as the aforementioned scouting function.

At this moment a waveformas illustrated in FIG. 3A and a waveform as illustrated in the rear portion of FIG. 3C are sequentially outputted from the output terminal OUT of the encoder 1.

Next, an infrared signal is outputted from the infrared light emitting diode LED 1 by the aforementioned operation to thereafter make the robot generate a warning sound.

Next, when the user wants the robot released either from the alert function or scouting function, the user presses the first switch SW2 of the operation command switching means 6 under a state that the function selecting switch SW1 is kept inoperative.

When the first switch SW2 is rendered conductive, a closed circuit is formed through the diode D5 to thereby supply a low level signal to the enable terminal $\overline{TE}$ and input terminal DT1 of the encoder 1 and to thereby supply an open signal to the input terminal DT2.

Furthermore, the same signal of secret-coded number as when in the scouting function is applied to the input terminals A1–A7.

At this moment, the waveform as illustrated in FIG. 3A and the waveform as illustrated in the rear portion of FIG. 3B are sequentially outputted from the output terminal OUT of the encoder 1 to thereby make the infrared signal outputted by the aforementioned operation from the infrared light emitting diode LED 1 and to thereafter make the robot perform a releasing function.

If the user wants the robot to operate in a movement operation among the alert and movement functions, the user fixes the function selecting switch SW1 to an "ON" position.

When the user wants the robot to move forwardly among the movement functions, the user presses the second switch SW3 of the operation command switching means 6.

When the second switch SW3 is rendered conductive, a current flows through the diode D4 in a closed circuit which is formed by the positive (+) terminal of battery BAT→stationary contact SW1b of function selecting switch SW1→movable contact SW1a of function selecting switch SW1→resistor R1→anode of the diode D1→cathode of the diode D1→movable contact SW3a of the second switch SW3→negative(−) terminal of battery BAT, to thereby supply a low level signal to the input terminal DT2 of the encoder 1.

Furthermore, a current flows through a current loop which is formed by the positive (+) terminal of battery BAT→stationary contact SW1b of function selecting switch SW1→movable contact SW1a of function selecting switch SW1→resistor R2→diode D2→input terminal DT1 of the encoder 1, to thereby supply a high level voltage to the input terminal DT1 of the encoder 1.

Accordingly, at this moment, a waveform as illustrated in FIG. 3A and a waveform as illustrated in the rear portion of FIG. 3F are sequentially outputted from the output terminal OUT of the encoder 1 to thereby move the robot forwardly.

Meanwhile, when the user wants the robot to move to the left among the movement functions, the user presses the first switch SW2 of the operation command switching means 6.

At this moment a low level signal is supplied to the input terminal DT1 of the encoder 1, a high level signal to the input terminal DT2, and a low level signal is supplied to the enable terminal $\overline{TE}$, so that a waveform as illustrated in FIG. 3A and a waveform as illustrated in the rear portion of FIG. 3E are outputted from the output terminal OUT of the encoder 1 to thereby cause the robot to move to the left.

When the user wants the robot to move to the right among the movement functions, the user presses the third switch SW4 under a state that the function selecting switch SW1 is kept conductive.

At this moment, a high level signal is supplied to the input terminals DT1 and DT2 of the encoder 1, a low level signal is supplied to the enable terminal $\overline{TE}$, and a signal of secret-coded numbers inputted during the scouting operation of the alert functions is inputted to the input terminal A1-A7 of the aforementioned secret numbers.

Next, a waveform as illustrated in FIG. 3A and a waveformas illustrated in the rear portion of FIG. 3G are sequentially outputted from the output terminal of the encoder 1 to thereby make the robot move to the right through the aforementioned operations.

Next, when the user wants the robot to stop to take a rest, the user transmits a stop & rest command to the robot by pressing a button (not shown). Then the robot is stopped to rest.

Meanwhile, when the user by mistake presses more than two switches from the first, second and third switches SW2, SW3, and SW4 simultaneously, the encoder 1 designates a priority to thereby output only one operating signal from the three operating signals of the alert functions or outputs only one operating signal from the three operating signals of the movement functions.

The priority is determined by the user when the operation command switching means is assembled to the encoder 1.

As seen by the foregoing, according to the remote control transmitting device of a robot in accordance with the present invention, a 4-switch combination to the conventional encoder enables to output 6 different operating command signals, so that the robot can be easily operated, a manufacturing cost can be reduced and operating functions can be diversified.

Furthermore, a hand-carried controller for the robot becomes possible because the remote control transmitting device is light and the circuit is simple to thereby make same easy to be manufactured.

While a preferred embodiment of the invention has been described and shown, those skilled in the art will understand that various modifications can be made without departing from the true spirit of the invention. Accordingly, all such modifications are intended to be covered by the appended claims.

What is claimed is:

1. A remote control transmitting device for a robot, comprising:
   a power source for outputting a direct voltage;
   secret number switching means for inputting secret numbers of a user;
   a function selecting switch for allowing the user to select a function from among a plurality of different functions of the robot;
   a high level and open signal transmitting circuit, coupled to said function selecting switch, wherein, when said function selecting switch is rendered conductive, a high level voltage outputted from the battery is received to thereby output a high level voltage indicative of a first predetermined function of the robot, and when said function selection switch is turned off, an open signal is generated indicative of a second predetermined function of the robot which is different from the first predetermined function, wherein said high level and open signal transmitting circuit comprises a plurality of resistors, and a plurality of diodes;
   operation command switching means coupled to receive a plurality of different operation commands from the user;
   a low and enable signal transmitting circuit for outputting a low signal and an enable signal after receiving the user's operation command signal outputted from the operation command switching means;
   an encoder, coupled to said low and enable signal transmitting circuit, said secret number switching means, and said high level and open signal transmitting circuit, for outputting secret-coded signals, and function and operation command signals; and
   an output transmitting circuit coupled to said encoder, for outputting signals from said encoder as infrared signals to the robot.

2. The remote control transmitting device as defined in claim 1, wherein the secret number switching means comprises a plurality of switches having a plurality of movable contacts, respectively, said movable contacts being commonly connected to an enable terminal of said encoder.

3. The remote control transmitting device as defined in claim 2, wherein said plurality of switches includes a plurality of stationary contacts, respectively, said contacts being respectively connected to input terminals of said encoder.

4. The remote control transmitting device as defined in claim 1, wherein a ground terminal of said encoder is commonly connected to said enable terminal of said encoder.

5. The remote control transmitting device as defined in claim 1, wherein said operation command switching means comprises a first switch, a second switch and a third switch.

6. The remote control transmitting device as defined in claim 5, wherein a movable contact of said first switch, a movable contact of said second switch and a movable contact of said third switch are commonly connected to a negative terminal of the power source.

7. A remote control transmitting device for a robot, comprising:
- a power source for outputting a direct voltage;
- secret number switching means for inputting secret numbers of a user;
- a function selecting switch for allowing the user to select a function from among a plurality of different functions of the robot;
- a high level and open signal transmitting circuit, coupled to said function selecting switch, wherein, when said function selecting switch is rendered conductive, a high level voltage outputted from the battery is received to thereby output a high level voltage indicative of a first predetermined function of the robot, and when said function selection switch is turned off, an open signal is generated indicative of a second predetermined function of the robot which is different from the first predetermined function;
- operation command switching means coupled to receive a plurality of different operation commands from the user;
- a low and enable signal transmitting circuit for outputting a low signal and an enable signal after receiving the user's operation command signal outputted from the operation command switching means, wherein said low and enable signal transmitting circuit comprises a plurality of diodes;
- an encoder, coupled to said low and enable signal transmitting circuit, said secret number switching means, and said high level and open signal transmitting circuit, for outputting secret-coded signals, and function and operation command signals; and
- an output transmitting circuit coupled to said encoder, for outputting signals from said encoder as infrared signals to the robot.

8. The remote control transmitting device as defined in claim 7, wherein the secret number switching means comprises a plurality of switches having a plurality of movable contacts, respectively, said movable contacts being commonly connected to an enable terminal of said encoder.

9. The remote control transmitting device as defined in claim 8, wherein said plurality of switches includes a plurality of stationary contacts, respectively, said contacts being respectively connected to input terminals of said encoder.

10. The remote control transmitting device as defined in claim 7, wherein said operation command switching means comprises a first switch, a second switch and a third switch.

11. The remote control transmitting device as defined in claim 10, wherein a movable contact of said first switch, a movable contact of said second switch and a movable contact of said third switch are commonly connected to a negative terminal of the power source.

12. The remote control transmitting device as defined in claim 7, wherein a ground terminal of said encoder is commonly connected to said enable terminal of said encoder.

* * * * *